United States Patent [19]
Olschewski et al.

[11] 4,255,000
[45] Mar. 10, 1981

[54] ROTARY DRILL BIT

[75] Inventors: Armin Olschewski; Lothar Walter, both of Schweinfurt; Manfred Brandenstein, Eussenheim; Heinrich Kunkel, Schweinfurt; Gösta Norlander, Surte, all of Fed. Rep. of Germany

[73] Assignees: Sandvik AB, Fack; Aktiebolaget SKF, Gothenburg, both of Sweden

[21] Appl. No.: 59,452

[22] Filed: Jul. 20, 1979

[30] Foreign Application Priority Data

Sep. 23, 1978 [DE] Fed. Rep. of Germany ... 7828401[U]

[51] Int. Cl.³ .............................................. F16C 19/32
[52] U.S. Cl. ..................................... 308/8.2; 308/231
[58] Field of Search ............... 308/8.2, 235, 231, 234, 308/226, 222; 175/371

[56] References Cited

U.S. PATENT DOCUMENTS

| 2,664,322 | 12/1953 | Boice | 308/8.2 |
| 2,673,128 | 3/1954 | Reed | 308/8.2 |
| 3,656,764 | 4/1972 | Robinson | 175/371 |

Primary Examiner—Lenard A. Footland
Attorney, Agent, or Firm—Eugene E. Renz, Jr.

[57] ABSTRACT

A rotary drill bit assembly comprising a trunnion and at least one rotary cutter mounted on the trunnion. The trunnion is supported by bearings including at least one radial bearing and at least one axial roller bearing. The axial bearing is comprised of conical rollers and one of the races for this bearing is disposed perpendicular to the axis of rotation of the rotary cutter and the complementary bearing race is conical. A guide rim is associated with one of the bearing races which guides the conical rollers in a radially outward direction.

6 Claims, 2 Drawing Figures

ROTARY DRILL BIT

BACKGROUND OF THE INVENTION

The present invention relates to rotary drill bits with a plurality of rotary cutters, each of the cutters being supported on a trunnion connected in at least one radial bearing and on a conical axial roller bearing.

Rotary drill bits are not new per se. In the prior art it is known to mount the rotary cutters on two cylindrical roller bearings which each serve as radial bearings and a conical axial roller bearing between the radial bearings. The conical rollers of the axial bearing run, in this instance, between two conical bearing races which are relatively difficult to manufacture accurately with respect to angle and alignment with each other and which are incorporated on the trunnion or in the rotary drill bit. This prior known rotary drill bit has the further disadvantage that play in the radial bearing races causes an opposite radial motion of the two bearing races of the conical axial roller bearing during rotation of the rotary cutter. This motion can lead to harmful jamming of the conical rollers between the raceways so that a premature breakdown of the axial roller bearing results. Furthermore, very little radial play must be allowed from the start in the radial bearings. Hence, the manufacturing tolerances for the bearing elements must be held within close, narrow limits which translates into relatively high manufacturing costs.

SUMMARY OF THE INVENTION

With the foregoing in mind, it is an object of the present invention to provide a rotary drill bit assembly characterized by novel features of construction and arrangement which overcome some of the disadvantages of prior assemblies noted above. To this end in the rotary drill bit the rotary cutters each are supported in at least one radial bearing and one axial conical roller bearing on the trunnion connected with the drill bit body. The improvement of the present invention consists in providing one of the two bearing races of each axial roller bearing to run flat and perpendicular to the axis of rotation of the rotary cutter. The complementary bearing race is conical and includes a guide rim for guiding the conical rollers in a radially outward direction. The flat bearing race is preferably formed integrally with the trunnion or in the rotary cutter. The complementary conical bearing race is formed integrally with the trunnion or the rotary cutter. In the illustrated embodiment the conical roller is designed to include a full complement of rollers.

By this construction the bearing can tolerate large radial play without impairing the functionality of the axial conical roller bearing. Thus, the overall assembly is economical to manufacture and assemble.

By the bearing support structure of the present, the flat bearing race of the axial roller bearing can sustain small movements within the radial play of the radial bearings without jamming the conical rollers in the axial bearing. Relatively large manufacturing tolerances can, therefore, be provided for the bearing elements which results in economy of production. Additionally, a slight amount of wear of the elements of the radial bearing of a rotary cutter and corresponding increase of radial play is quite permissible. Furthermore, the axial roller bearings can be economically produced since each has a flat bearing race which is easy to manufacture.

By forming the raceways for the axial roller integral with the trunnion and the rotary cutter, the entire assembly is relatively compact and the construction space between the rotary cutter and trunnion is minimized by reason of the elimination of the additional races for the axial roller bearing. A further advantage of the assembly of the present invention is that with a full complement of conical rollers, the load withstanding capacity of the entire assembly is increased considerably. This construction also eliminates the need for a bearing cage which reduces overall costs. The rollers mutually touch and guide each other during operation in the equivalent manner to one where a cage is employed.

BRIEF DESCRIPTION OF THE DRAWINGS

These and other objects of the present invention and the various details of the operation and construction thereof are hereinafter more fully set forth with reference to the accompanying drawings, wherein.

DESCRIPTION OF THE PREFERRED EMBODIMENTS

Figure 1:
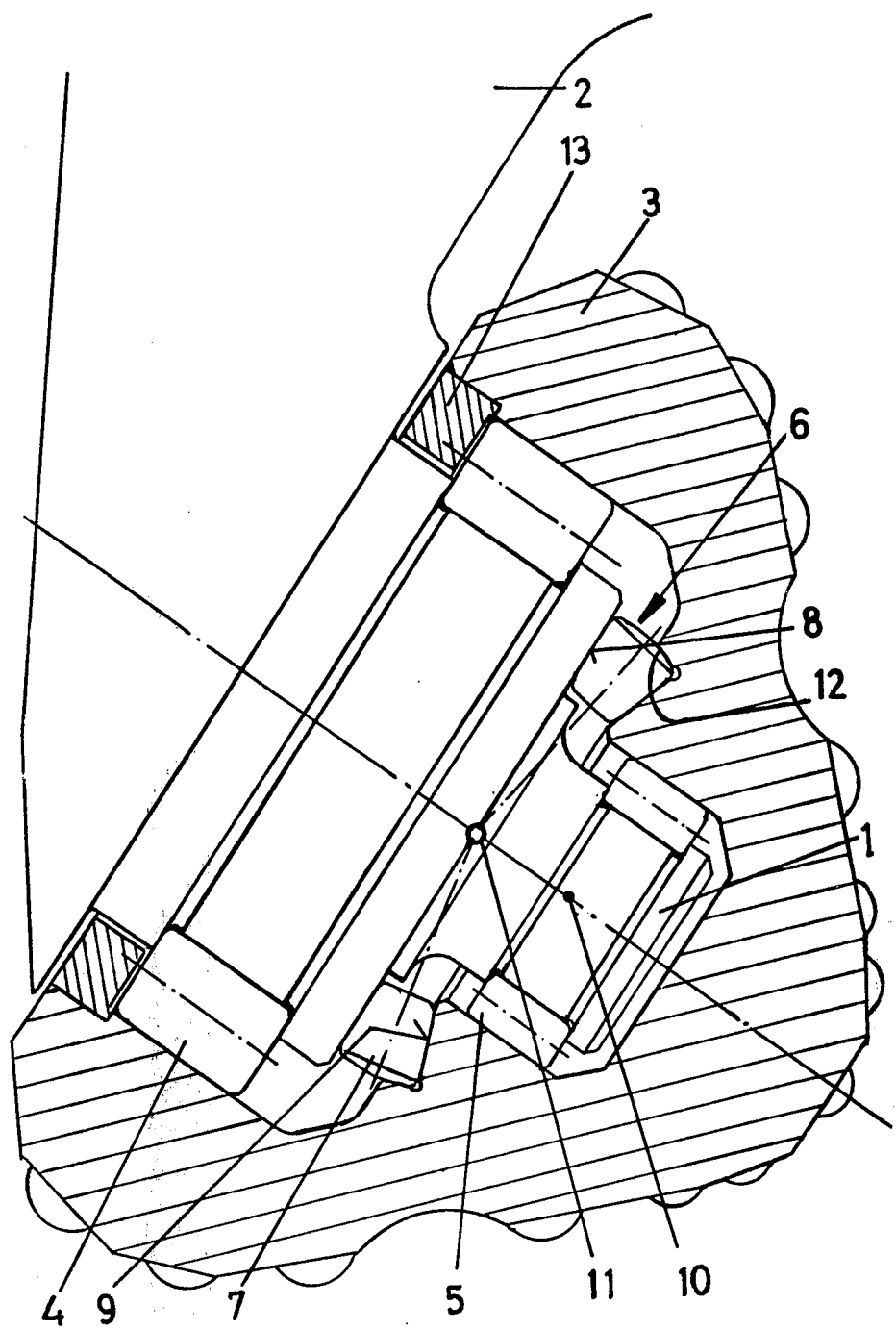
FIG. 1 is a longitudinal cross sectional view through the rotary cutter of a rotary drill bit constructed in accordance with the present invention.

Referring now to the drawing and particularly to FIG. 1 thereof, one of a plurality of trunnions 1 of a rotary drill bit assembly is shown which projects from the drill bit body 2 and on which a conical rotary cutter 3 is rotatably supported. The bearing support for the rotary cutter 3 includes, in the present instance, a cylindrical roller bearing 4 adjacent the drill bit body 2 and a cylindrical roller bearing 5 spaced outwardly from the drill bit body 2 which operate as radial bearings. An axial roller bearing 6 comprised of conical rollers is arranged between the cylindrical roller bearings 4 and 5. As illustrated the conical rollers 7 of the axial roller bearing 6 run between a flat bearing race 8 and a conically designed bearing race 9. As illustrated, the flat bearing race 8 extends perpendicularly to the axis of rotation 10 of the rotary cutter 3 and lies in a plane wherein the axis rotation of the conical roller 7 and the rotational axis 10 intersect at a point 11. The conical bearing race 9 has a guide rim 12 which guides the conical rollers in a radially outward direction. In the present instance, the flat bearing race 8 is formed integrally in the trunnion 1 and the conical bearing race 9 is formed integrally in the interior peripheral surface of the rotary cutter 3 to provide a compact construction comprised of relatively few parts.

Additionally, in the present instance, the axial roller bearing 6 does not utilize a cage and is comprised of a full complement of conical rollers which mutually touch and guide each other along their outside surface. Thus, even play occurring as the result of bearing wear in the cylindrical roller bearings 4 and 5 causes no jamming of the conical rollers 7 in the axial roller bearing 6 by reason of the fact that relative radial motions between the bearing surface 8 and the conical bearing surface 9 can be tolerated without interference.

In assembling a rotary drill bit in accordance with the present invention, initially the edge ring 13 is slipped onto the trunnion and the cylindrical rollers of the bearings 4 and 5 are inserted in their races on the trunnion 1. Next, the conical bearing race 9 of the rotary cutter is filled with the conical rollers 7. Thereafter, the rotary cutter 3 with the conical rollers 7 is axially positioned on the trunnion until the conical rollers come to rest or abut the flat bearing race 8. Lastly, the edge ring 13 is fixed in position, for example, by welding in the bore of the rotary cutter to thereby secure the rotary cutter against being withdrawn from the trunnion in an axial direction.

The bearings may be lubricated by filling the bearing space between the rotary cutter 3 and the trunnion with a lubricating grease and in this manner lubricate the cylindrical rollers of the bearings 4 and 5 as well as the conical rollers for the axial bearings 6.

Figure 2:
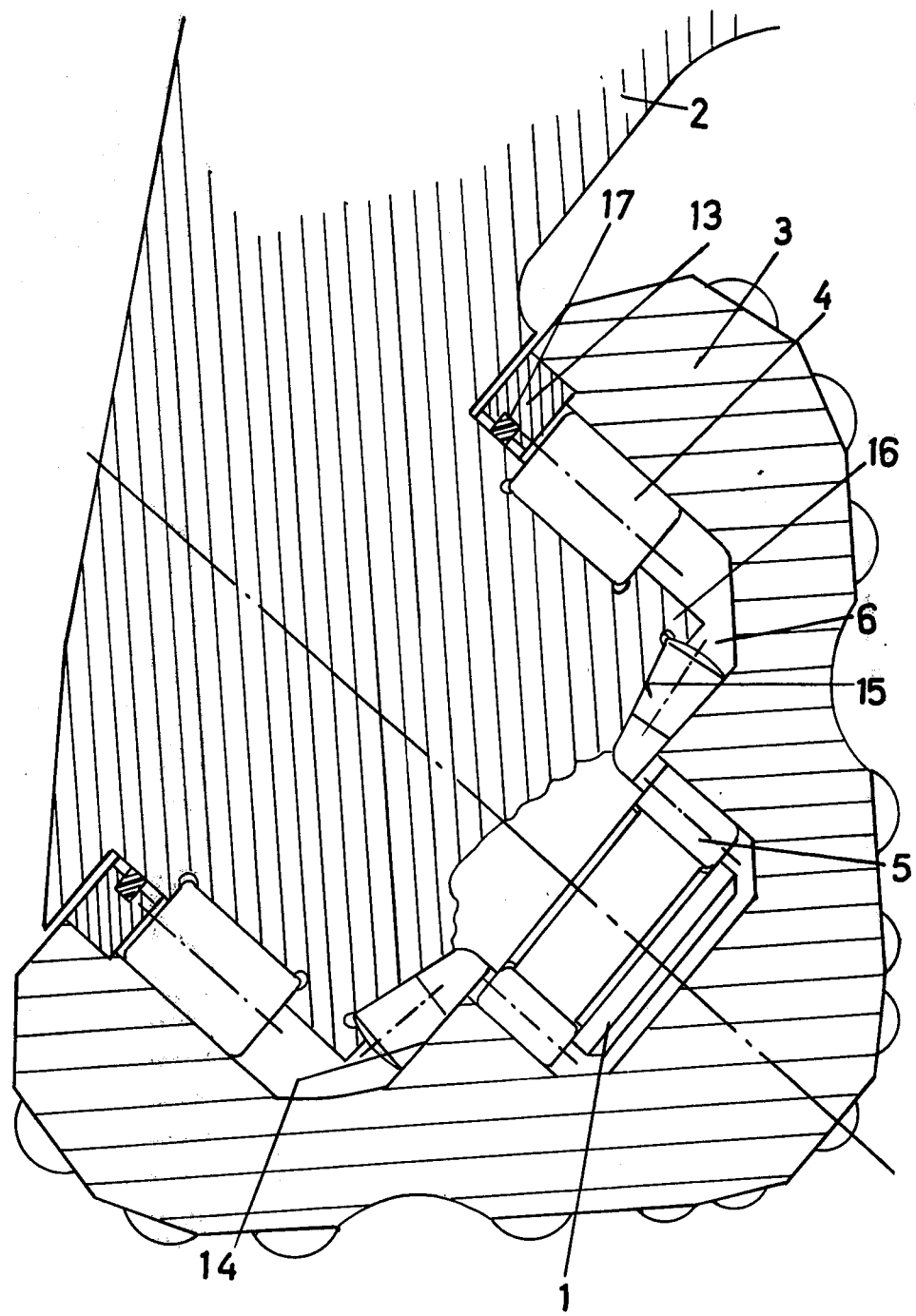
FIG. 2 shows a similar longitudinal cross section of a modified rotary drill bit in accordance with the present invention.

There is illustrated in FIG. 2 a modified form of rotary drill bit in accordance with the present invention. In this instance, the rotary cutter 3 is supported in two cylindrical roller bearings 4 and 5 and an axial roller bearing 6 having a plurality of conical rollers 7 and in this respect it is identical to the mounting arrangement illustrated in FIG. 1. The flat bearing race 14 is incorporated in the rotary cutter 3 and the conical bearing race 15 is provided with a guide rim 16 in the trunnion. The axial conical roller by reason of this construction can make slight relative radial motions between the races 14 and 15 without damage. In the present instance a piston ring 17 seats in the bore of the edge ring 13 which slides on the trunnion and therefore seals the bearing space between the rotary cutter 3 and the trunnion 1 toward the outside.

Even though particular embodiments of the present invention have been illustrated and described herein, it is not intended to limit the invention and changes and modifications may be made therein within the scope of the following claims.

What is claimed is:

1. A rotary drill bit assembly comprising a trunnion and at least one rotary cutter mounted on the trunnion, bearing means supporting the rotary cutter on the trunnion comprising at least one radial bearing and at least one axial roller bearing comprised of conical rollers, at least one of the bearing races of the axial roller bearing disposed perpendicular to the axis of rotation of the rotary cutter and the complementary bearing race being conical, and a guide rim associated with one of said bearing races which guides the conical rollers in a radial outward direction.

2. A rotary drill bit as claimed in claim 1 wherein said one bearing race is formed integrally in the trunnion.

3. A rotary drill bit as claimed in claim 1 wherein said one bearing race is formed integrally in the interior surface of the rotary cutter.

4. A rotary drill bit as claimed in claim 1 wherein said conical race is formed integrally in the trunnion.

5. A rotary drill bit as claimed in claim 1 wherein said conical race is formed integrally in the interior surface of the rotary cutter.

6. A rotary drill bit as claimed in claim 1 wherein said axial roller bearing comprises a full complement of conical rollers.

* * * * *